J. M. McDANIEL.
SUPPLY VALVE FOR TANKS.
APPLICATION FILED JUNE 28, 1909.
964,047.
Patented July 12, 1910.
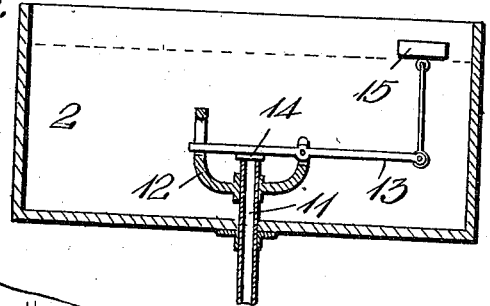
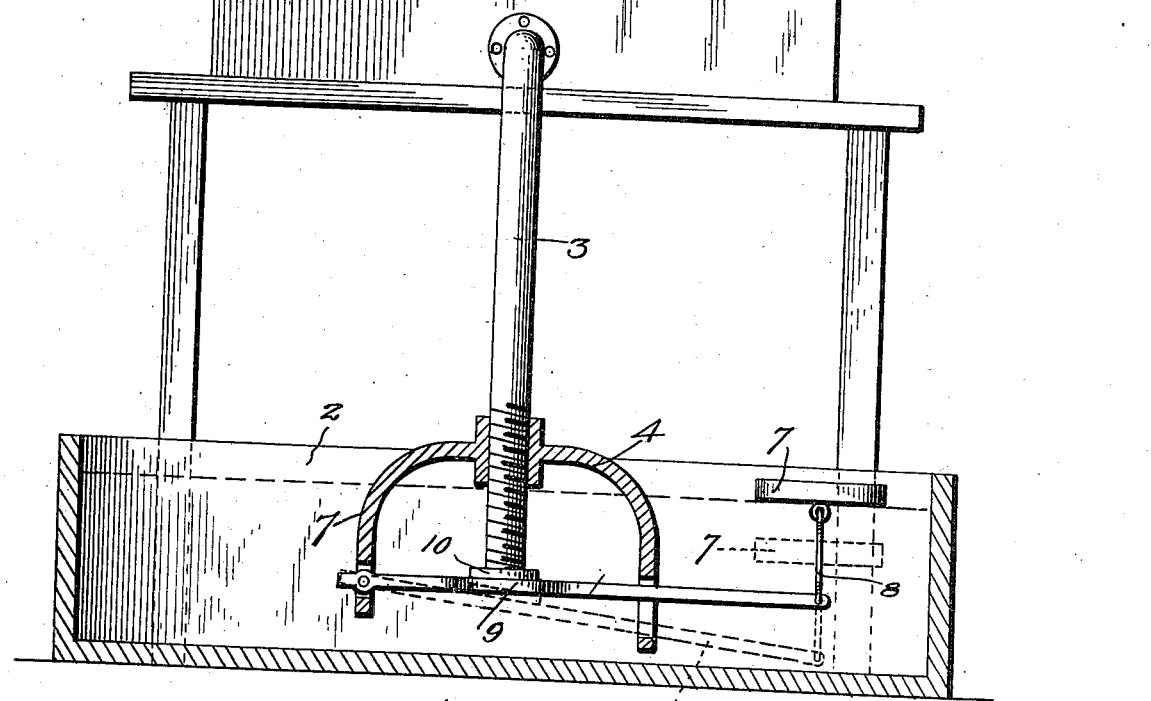
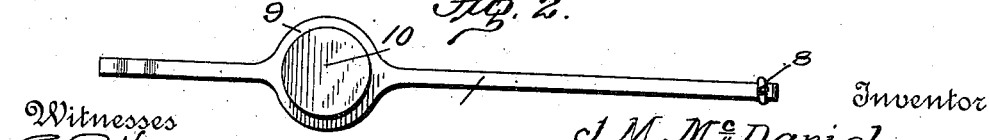
Witnesses
E. E. Hunt
C. H. Griesbauer
Inventor
J. M. McDaniel
by H. B. Willson & Co.
Attorneys

UNITED STATES PATENT OFFICE.

JOB M. McDANIEL, OF NORMAN, OKLAHOMA.

SUPPLY-VALVE FOR TANKS.

964,047.  Specification of Letters Patent.  Patented July 12, 1910.

Application filed June 28, 1909. Serial No. 504,812.

*To all whom it may concern:*

Be it known that I, JOB M. McDANIEL, a citizen of the United States, residing at Norman, in the county of Cleveland and State of Oklahoma, have invented certain new and useful Improvements in Supply-Valves for Tanks; and I do declare the following to be a full, clear, and exact description of the invention, such as will enable others skilled in the art to which it appertains to make and use the same.

This invention relates to improvements in supply valves for tanks.

The object of the invention is to provide a simple form of valve which is particularly adapted for use in connection with watering tanks which are filled from a main supply tank and having means whereby the flow of water to the watering tank will be automatically controlled to keep the water therein at the proper level.

With the foregoing and other objects in view, the invention consists of certain novel features of construction, combination and arrangement of parts, as will be more fully described and particularly pointed out in the appended claim.

In the accompanying drawings, Figure 1 is a side view of a supply tank and a sectional view of a watering tank illustrating my invention applied thereto, showing in full lines the closed position of the valve and in dotted lines the open position of the same. Fig. 2 is a detail plan view of the valve and its operating lever. Fig. 3 is a detail section view of a watering tank showing a modified arrangement of the water supply pipe and valve.

Referring more particularly to the drawings, 1 denotes a supply tank and 2 denotes a watering tank. The supply tank 1 is provided with a discharge pipe 3 having a threaded lower end on which is screwed or otherwise secured a valve supporting yoke 4. The lower end of the pipe 3 and the yoke project a suitable distance into the watering tank and to one side of the yoke is pivotally connected one end of a valve operating lever 5, the opposite end of which projects through a guide slot 6 formed in the opposite side of the yoke. To the free end of the valve lever 5 is connected an operating float 7, said float being connected to the lever by a loose or flexible connection 8. The lever 5 is provided at a suitable point in its length with a valve supporting plate 9 on which is secured a disk valve 10 which is formed of leather, rubber or other suitable material.

In the operation of the device, as the watering tank 2 fills with water from the supply tank 1 through the discharge pipe 3, the float 7 will rise thereby raising the outer end of the valve lever 5, thus bringing the valve 10 up into engagement with the lower open end of the pipe 3, thus closing said pipe and cutting off the flow of water therethrough to the watering tank. As long as the water in the tank 2 remains at the proper level, the valve 10 will be held in operative engagement to close the discharge end of the pipe 3. When the water is removed from the tank 2, the float will lower, thus permitting the valve lever 5 to drop and disengage the valve 10 from the end of the pipe 3 which will permit more water to flow into the tank 2 from the supply tank. When the water in the tank 2 has again reached the desired level, the valve will again be closed by the float 7 in the manner hereinbefore described.

In Fig. 3 of the drawings is shown a modified arrangement of the invention. In this figure the water supply pipe 11 is shown as entering the bottom of the watering tank 2 and the yoke 12 arranged thereon in a reverse position from that in which the yoke 4 is shown in Fig. 1. The valve lever 13 is also shown reversed to bring the valve 14 into engagement with the end of the pipe, and the lever is also shown as being pivoted in the opposite end of the yoke and between the valve and the float 15 so that the latter may operate the lever to engage and disengage the valve with the pipe when the water rises and lowers in the tank.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

In a device of the class described, a supply tank, a watering tank, a discharge pipe leading from the supply tank to a point adjacent the bottom of the watering tank, and having its discharge end threaded, a substantially U-shaped lever supporting yoke having a central threaded collar to receive the threaded dischange pipe whereby the yoke is adapted for longitudinal adjustment on the pipe, the legs of said yoke extending on opposite sides of the pipe and having one of them provided with a closed slot, a valve lever pivoted to one leg of the yoke and passing through the slot in the opposite leg thereof, said lever having an enlargement adjacent its center, a valve disk secured over the enlargement and adapted to be brought into engagement with the end of the pipe by said lever, and a float flexibly connected to the free outer end of the lever and adapted to be operated by the rise and fall of the water in the tank whereby the discharge pipe is automatically opened and closed.

In testimony whereof I have hereunto set my hand in presence of two subscribing witnesses.

JOB M. McDANIEL.

Witnesses:
GARRET HILL,
J. B. DUDLEY.